US008902543B1

(12) United States Patent
Wang et al.

(10) Patent No.: US 8,902,543 B1
(45) Date of Patent: Dec. 2, 2014

(54) DISC DRIVE APPARATUS WITH VAPOR-TRAPPING PATHWAY

(71) Applicant: Seagate Technology LLC, Cupertino, CA (US)

(72) Inventors: Fei Wang, Bloomington, MN (US); Marcus John Wieczorek, Shakopee, MN (US); Yimin Niu, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/914,377

(22) Filed: Jun. 10, 2013

(51) Int. Cl.
*G11B 17/02* (2006.01)
*G11B 33/14* (2006.01)

(52) U.S. Cl.
CPC .................................. *G11B 33/1453* (2013.01)
USPC ....................................................... 360/99.08

(58) Field of Classification Search
CPC ................................................... G11B 17/022
USPC .............. 360/97.13, 99.08; 310/90
See application file for complete search history.

(56) References Cited

U.S. PATENT DOCUMENTS

| 5,295,028 | A | | 3/1994 | Elsing |
| 5,482,381 | A | | 1/1996 | Krum et al. |
| 5,841,607 | A | * | 11/1998 | Khan et al. ................ 360/99.08 |
| 6,052,257 | A | | 4/2000 | Branger et al. |
| 6,091,568 | A | | 7/2000 | Gilliland |
| 6,285,527 | B1 | * | 9/2001 | Kennedy et al. ........... 360/99.08 |
| 6,449,120 | B1 | | 9/2002 | Ridenour et al. |
| 6,538,354 | B2 | * | 3/2003 | Obara ............................ 310/90 |
| 6,707,640 | B2 | * | 3/2004 | Nishio et al. ............... 360/99.08 |
| 7,839,602 | B2 | | 11/2010 | Dunckley et al. |

* cited by examiner

*Primary Examiner* — Angel Castro
(74) *Attorney, Agent, or Firm* — Crawford Maunu PLLC

(57) ABSTRACT

Various aspects of the present disclosure are directed toward a disc driver apparatus including a base, a disc drive actuator assembly, and a vapor-trapping pathway. The base, in certain embodiments, has an upwardly-facing portion with a first step and an adjacent second step that is vertically lower than the first step. The disc drive actuator assembly in some embodiments includes a pivot shaft, an E-block, and a plurality of bearings. The pivot shaft is fixed relative to the base, and the E-block has a portion facing the upwardly-facing portion of the base. The plurality of bearings are designed to facilitate rotation of the E-block around the pivot shaft. The vapor-trapping pathway includes the first step and a trap region that is partly defined by the second step, the vapor-trapping pathway being designed to pass vapor flow outwardly, relative to the pivot shaft, from a level below the bearings to the trap region.

20 Claims, 4 Drawing Sheets

DISC DRIVE APPARATUS WITH VAPOR-TRAPPING PATHWAY

BACKGROUND

Disc drives are used for data storage in modern electronic products ranging from audio players to computer systems and networks. A disc drive typically includes a mechanical portion, or head disc assembly (HDA), and electronics in the form of a printed circuit board assembly (PCBA), mounted to an outer surface of the HDA. The PCBA controls HDA functions and provides an interface between the disc drive and its host. An HDA includes moving parts such as one or more magnetic discs affixed to a spindle motor assembly for rotation at a constant speed, an actuator assembly supporting an array of read/write heads that traverse generally concentric data tracks radially spaced across the disc surfaces and a voice coil motor (VCM) providing rotational motion to the actuator assembly. In operation, the magnetic-recording disc rapidly rotates by the spindle motor to access (read and/or write) the data stored on the disc.

SUMMARY

Various example embodiments are directed to a disc drive apparatus with vapor-trapping pathways.

According to an example embodiment, various aspects of the present disclosure are directed toward a disc drive apparatus including a base, a disc drive actuator assembly with an E-block, and a vapor-trapping pathway between the E-block and the base. In certain embodiments, the base has an upwardly-facing portion with a first step and an adjacent second step that is vertically lower, relative to the bearings, than the first step.

The disc drive actuator assembly, in some embodiments, includes a pivot shaft, an E-block, and a plurality of bearings designed to facilitate rotation of the E-block around the pivot shaft. The pivot shaft is fixed relative to the base, and the E-block has a portion facing the upwardly-facing portion of the base.

In specific embodiments, the vapor-trapping pathway includes the first step and a trap region that is partly defined by the second step, the vapor-trapping pathway being designed to pass vapor flow outwardly, relative to the pivot shaft, from a level below the bearings to the trap region.

Certain embodiments of the present disclosure are directed toward a method for lessening outflow of vapor in a disc drive apparatus having a base and a disc drive actuator assembly. The disc drive actuator assembly includes an E-block and a pivot shaft relative to the base.

Consistent with above, such methods can include the steps of providing a vapor-trapping between the base and the E-block, operating the disc drive apparatus, and trapping vapor in the vapor-trapping pathway. The vapor-trapping pathway is defined by the interface of the base and the E-block. Specifically, an upwardly facing portion of the base with a first step and an adjacent second step that is lower than the first step, and a portion of the E-block that faces the upwardly-facing portion of the base.

The disc drive apparatus is then operated by causing the E-block to rotate around the pivot shaft, via a plurality of bearings. The vapor trapping pathway traps vapor that traverses the first step and a trap region that is party defined by the second step, the vapor-trapping pathway is designed to pass vapor flow outwardly, relative to the pivot shaft. The vapor-trapping pathway is located at a level below the plurality of bearings.

The above discussion/summary is not intended to describe each embodiment or every implementation of the present disclosure. The figures and detailed description that follow also exemplify various embodiments.

BRIEF DESCRIPTION OF THE DRAWINGS

Various example embodiments may be more completely understood in consideration of the following detailed description in connection with the accompanying drawings, in which.

Figure 1A:
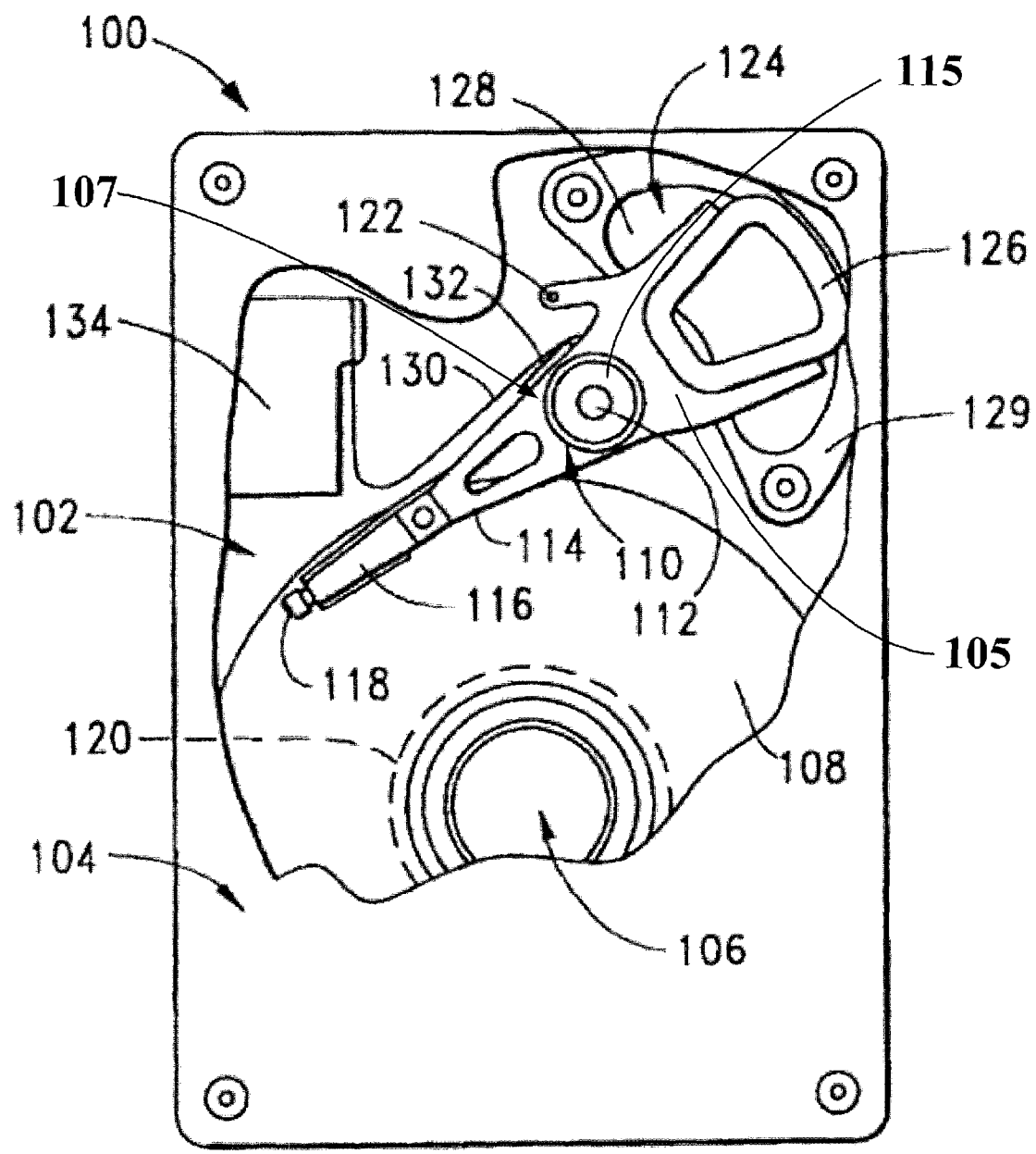
FIG. 1A is a top view of a disc drive, consistent with various aspects of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined in the claims. In addition, the term "example" as used throughout this application is only by way of illustration, and not limitation.

DETAILED DESCRIPTION

Aspects of the present disclosure are believed to be applicable to a variety of different types of devices, systems and arrangements involving long-term use of enclosed storage devices. Specific embodiments of the present disclosure are believed to be particularly beneficial to a disc drive apparatus including complex moving/mechanisms such as pivot bearings, spindle motors, and HDAs as described above. While the present disclosure is not necessarily so limited, various aspects of the disclosure may be appreciated through a discussion of examples using this context. Various example embodiments are directed to the reduction of grease vapor outgassing from an E-block in a disc drive actuator assembly and its implementation.

A disc drive unit typically includes an actuator assembly, as mentioned above, further including an E-block that pivots about a pivot shaft by way of a cartridge bearing assembly. The cartridge bearing assembly contains bearings contained between inner and outer races and further packed with lubricant to minimize resistance between the bearing and races. In use, the heat and motion of the cartridge bearing assembly causes some small particles of grease to vaporize (outgassing) and escape the cartridge bearing assembly. Control of the amount of outgassing that enters the interior enclosure of the disc drive is desirable since the vapor may affect the performance and reliability of the head/disc interface (HDI), which is an important part of the disc drive recording system. For example, it is known that small particles interfering with the head-to-disc interface can result in problems that require service/repair of the drive.

Some disc drive products have incorporated various elements, such as bearing-assembly seals, in attempt to reduce the rate of outgassing between the cartridge bearing assembly and the interior enclosure of the disc drive. Various types of seals can also be useful to control the relative humidity levels to a given level. The beneficial effects to such disc drive products are, however, limited as airflow caused by the spinning disk entering the cartridge bearing assembly and centrifugal force created by the movement of the actuator assembly around the pivot shaft exacerbate the outgassing of the bearing lubricant vapors into the interior enclosure of the disc drive.

Various aspects of the present disclosure are directed toward an apparatus including a base, a disc drive actuator assembly and a vapor-trapping pathway. The base in certain embodiments has an upwardly-facing portion with a first step and an adjacent second step that is vertically lower than the first step. The first step can be on either side of the lower second step (relative to the bearings). The disc drive actuator assembly includes a pivot shaft, an E-block and a plurality of bearings. The pivot shaft is fixed relative to the base. A portion of the E-block faces the upwardly-facing portion of the base. The plurality of bearings are designed to facilitate rotation of the E-block around the pivot shaft.

The vapor-trapping pathway traverses the first step and a trap region that is partly defined by the second step. The vapor-trapping pathway is configured and arranged to pass vapor flow outwardly, relative to the pivot shaft, from a level below the bearings to the trap region.

The vapor-trapping pathway of the present disclosure can be used in conjunction with a labyrinth seal on a bearing-cartridge assembly to prevent the outgassing of lubricant, such as grease, and lubricant vapor (vapor). The vapor-trapping pathway limits the amount of vapor outgassing into an interior enclosure of a disc drive apparatus. Within the interior enclosure of the disc drive apparatus, such vapor can damage moving components of the dis drive apparatus which in some cases may ultimately lead to failure of the disc drive.

Various example embodiments include an extruding portion of the E-block that extends into the trap region. The extruding portion provides further restriction of the trap region by creating several turns which further limit air and vapor flow and provide increased surface area on which the vapor particles may condense to. The turns (e.g., 90 degree flow-impeding walls) also slow down the velocity of the vapor increasing the amount of vapor that may be captured by the vapor-trapping pathway, and accordingly the vapor does not escape so easily into the interior enclosure of the disc drive.

According to various aspects of the present disclosure, the disc drive apparatus may further include an inner race fixed relative to the pivot shaft, an outer race fixed relative to the E-block, and a plurality of bearings located between the inner race and the outer race.

In certain embodiments, the E-block and the base define an elongated portion of the vapor-trapping pathway that is designed to block vapor flow by a first wall adjacent the trap region and defined by a transition between the first step and the second step. The first wall provides an area on which the vapor condenses. Such condensation on this first wall may be limited due to the centrifugal force created by the rotation of the E-block. Such centrifugal force extends outward, perpendicular from a pivot axis of the pivot shaft.

Certain embodiments of the present disclosure are characterized by a vapor-trapping pathway that passes vapor into the trap region at which condensation of the vapor is facilitated. Such facilitation may include reduced velocity of the vapor, increased surface area in a cross-sectional area of the vapor-trapping pathway, also utilizing existing forces within the disc drive apparatus to increase contact of the vapor with the surfaces of the vapor-trapping pathway.

Various example embodiments are directed to the vapor-trapping pathway being designed with a third step, wherein the first step, the second step and the third step are designed to direct vapor into a first wall, a second wall and a third wall.

According to various aspects of the present disclosure, the vapor-trapping pathway is designed to pass vapor along three such steps, including the first step and the second step, from below the plurality of bearings toward an outlet.

In certain specific/experimental embodiments, the E-block and the base define an elongated portion of the vapor-trapping pathway that is shaped with surface area of the path-surrounding walls to contain and condense vapor along a 0.13 inch run with a surface area of 0.140 inches$^2$. In related specific/experimental embodiments, this vapor-trapping pathway may be between 0.1 inches and 0.25 inches, with surface areas of 0.1 and 0.3 inches$^2$, respectively. A vapor-trapping pathway of such length and area optimizes the amount of vapor that may be condensed along the surfaces of the vapor-trapping pathway. Such dimensions are not intended to limit the present disclosure, but instead to provide exemplary ranges for specific/experimental applications.

In one type of embodiment, the E-block and the base are separated from one another by an air gap that defines the vapor-trapping pathway. Such an air gap between the E-block and base may be necessary to allow for clearance for the E-block rotation about the pivot axis of the pivot shaft and the static base. The air gap partially necessitates the need for the present disclosure as the air gap provides the path of escape of the vapor from within the cartridge-bearing assembly located in the disc drive actuator assembly to escape into the interior enclosure of the disc drive apparatus.

In some embodiments, the E-block portion, adjacent the second step of the upwardly-facing portion of the base, includes an extruding portion that extends into the trap region formed by the second step of the upwardly-facing portion of the base and a first wall and fourth wall of the trap region. The extruding portion forces the flow of vapor to further traverse several turns in the vapor-trapping pathway as well as an overall longer pathway.

Various example embodiments are directed to the vapor-trapping pathway including a first turn, a second turn, and a third turn, the turns designed to restrict a flow of vapor out of, and a flow of air into and out of, the disc drive actuator assembly.

According to various aspects of the present disclosure, a second wall of the vapor-trapping pathway is designed to condense vapor on the second wall utilizing centrifugal force acting on the air due to the rotation of the E-block causing the vapor to contact the second wall, whereby the condensed vapor on the second wall accumulates in the second step of the base due to gravitational force. Such aspects are further described in greater detail below.

In certain embodiments, the second step of the base is designed to condense, and thereby collect, vapor as gravitational forces act on the vapor causing the vapor to contact the second step of the base and condense. Such aspects are further described in greater detail below.

Certain embodiments of the present disclosure include a fourth wall of the vapor-trapping pathway designed to condense vapor on said wall utilizing centrifugal force acting on the air due to the rotation of the E-block causing the vapor to contact the fourth wall. Accordingly, the condensed vapor on the fourth wall accumulates in the second step of the base due to gravitational force.

In other embodiments, the vapor-trapping pathway is designed to restrict a flow of vapor out of, and a flow of air into and out of, the disc drive actuator assembly. Such inflow of air in the disc drive actuator assembly is one of many contributing factors that lead to the grease/lubricant within the bearing-cartridge assembly vaporizing and escaping into the interior enclosure of the disc drive apparatus.

Additionally, certain embodiments of the present disclosure are directed toward a method for lessening outflow of vapor in a disc drive apparatus having a base and a disc drive actuator assembly. The disc drive actuator assembly includes an E-block and a pivot shaft relative to the base.

The method includes the steps of providing a vapor-trapping between the base and the E-block, operating the disc drive apparatus, and trapping vapor in the vapor-trapping pathway. The vapor-trapping pathway is defined by the interface of the base and the E-block. Specifically, an upwardly facing portion of the base is provided with a first step and an adjacent second step that is lower than the first step (relative to the higher position of the bearings), and a portion of the E-block faces the upwardly-facing portion of the base. The disc drive apparatus operates by causing the E-block to rotate around the pivot shaft, via a plurality of bearings. The vapor trapping pathway traps vapor that traverses the first step and a trap region that is party defined by the second step, the vapor-trapping pathway is designed to pass vapor flow outwardly, relative to the pivot shaft. The vapor-trapping pathway is located at a level below the plurality of bearings.

Various aspects of the present disclosure are also further directed towards different aspects of the disc drive apparatuses, as described above, along with related methods of manufacture and uses. For example, these methods include the manufacture of the entire disc drive apparatuses and portions thereof such as the E-block and base.

Turning now to the figures, some of the benefits and issues addressed by the present disclosure will become apparent with a discussion of the bearing-related components used in an exemplary disc drive apparatus. FIG. 1A shows a disc drive 100 constructed in accordance with an exemplary embodiment of the present disclosure. The disc drive 100 includes a base 102 to which various components of the disc drive 100 are mounted. A top cover 104 (shown in partial cutaway fashion) cooperates with the base 102 to form a sealed environment for the disc drive.

A spindle motor (shown generally at 106) rotates one or more discs 108 at a constant high speed. Information is accessed (written to and/or read) via tracks (not designated) on the discs 108 through the use of an actuator assembly 110 including an E-block 105. The E-block 105 rotates about a pivot shaft 112 using a cartridge bearing assembly 115 positioned adjacent the discs 108. The base 102 and E-block 105 and the related vapor-trapping pathway 107 (under E-block 105), are discussed in greater detail below.

The actuator assembly 110 includes a plurality of actuator arms 114 which extend towards the discs 108, with one or more flexures 116 extending from each of the actuator arms 114. Mounted at the distal end of each of the flexures 116 is a head 118 which includes a slider assembly (not separately designated) designed to enable the head 118 to fly in close proximity to the corresponding surface of the associated disc 108.

At such time that the disc drive 100 is not in use, the heads 118 are moved over landing zones 120 near the inner diameter of the discs 108. The heads 118 are secured over the landing zones 120 through the use of a conventional latch arrangement, such as designated at 122, which prevents inadvertent rotation of the actuator assembly 110 when the heads are parked.

The radial position of the heads 118 is controlled through the use of a VCM 124, which typically includes a coil 126 attached to the actuator assembly 110, as well as one or more permanent magnets 128 and corresponding magnetically permeable pole-pieces 129 which establish a magnetic field in which the coil 126 is immersed. The controlled application of current to the coil 126 causes magnetic interaction between the magnetic field of the VCM 124 and electromagnetic fields induced in the coil 126, so that the coil 126 moves in accordance with the well-known Lorentz relationship. As the coil 126 moves, the actuator assembly 110 pivots about the pivot shaft 112 and the heads 118 are caused to move across the surfaces of the discs 108, again with such movement effecting rotation of the bearings and causing the lubricant vaporization.

A flex assembly 130 provides the requisite electrical connection paths for the actuator assembly 110 while allowing pivotal movement of the actuator assembly 110 during operation. The flex assembly 130 includes a printed circuit board 132 to which head wires (not shown) are connected, the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base 102 to a disc drive printed circuit board (not shown) mounted to the bottom side of the disc drive 100.

Figure 1B:
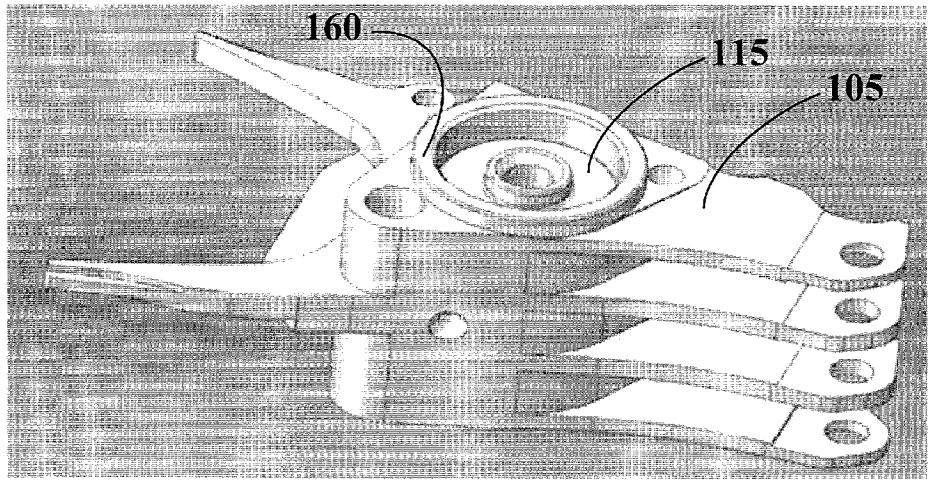
FIG. 1B is a perspective view illustrating an E-block, consistent with various aspects of the present disclosure.

Referring now to FIG. 1B, shown therein is a perspective view of an E-block 105 bottom consistent with an exemplary embodiment of the present disclosure. The E-block 105 in this exemplary figure includes the cartridge-bearing assembly 115 installed in the E-block 105, and located adjacent to a portion 160, of the E-block 105.

Figure 1C:
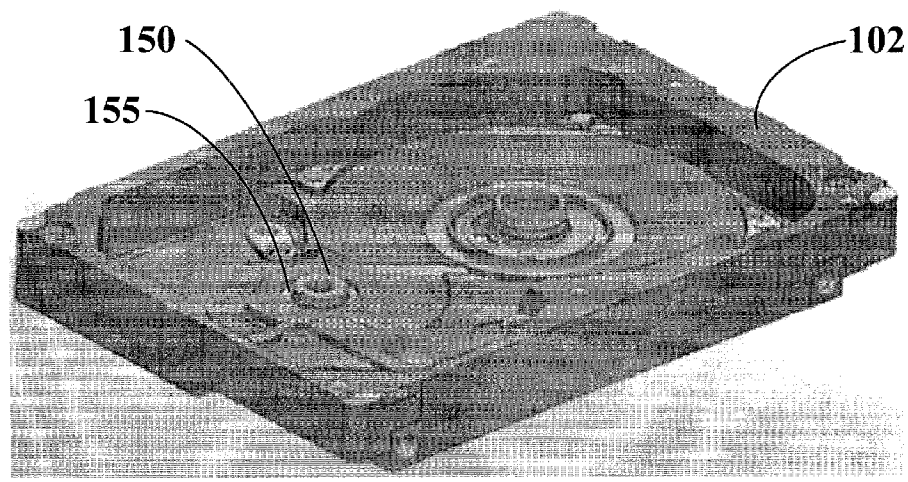
FIG. 1C is a perspective view illustrating a base, consistent with various aspects of the present disclosure.

Referring now to FIG. 1C, shown therein is a perspective view of a base 102 consistent with an exemplary embodiment of the present disclosure. The base 102 in this present figure includes a first step 150 and an adjacent second step 155.

The base 102 and the E-block 105, when assembled according to the present disclosure, provides an interface between the two structures, including: the downwardly-facing portion of the E-block, the upwardly-facing portion of the base, and the first step 250 and the adjacent second step formed in or along the upwardly-facing portion of the base. These aspects form a vapor-trapping pathway that among other benefits, controls vapor-leakage, facilitates condensation, and minimizes the inflow of air into the cartridge bearing assembly.

Figure 2:
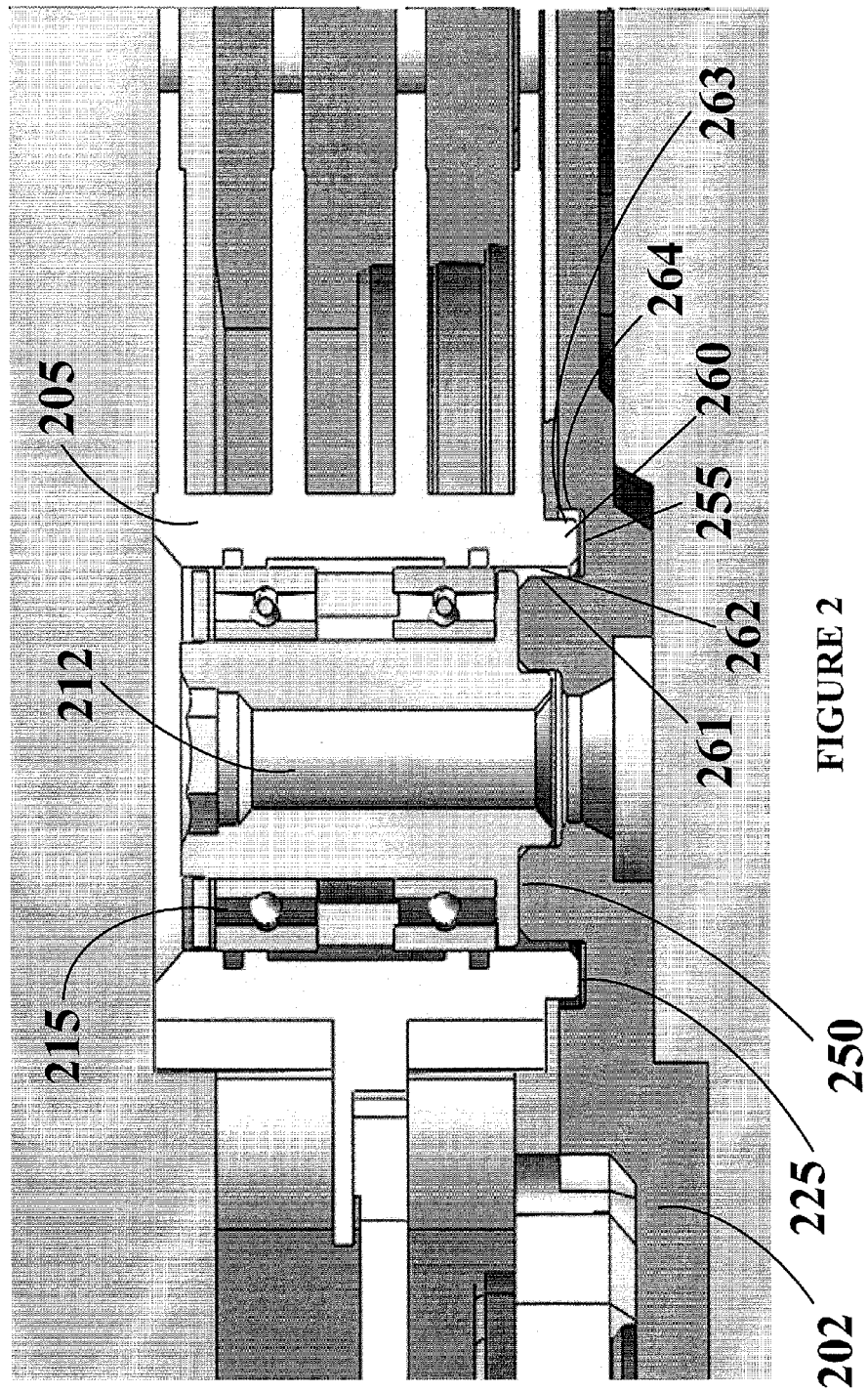
FIG. 2 is a cross-sectional side view of an actuator assembly including a vapor-trapping pathway, consistent with various aspects of the present disclosure.

FIG. 2 illustrates a cross-sectional side view of such a vapor-trapping pathway 225, consistent with various aspects of the present disclosure. As shown in FIG. 2, the vapor-trapping pathway includes a first step 250 and an adjacent second step 255 formed in the upwardly-facing portion of the base 202, and a portion 260, (which can be formed from or in the E-block 205), that faces the upwardly-facing portion of the base. The resulting vapor-trapping pathway 225 limits the amount of vapor that escapes the E-block 205 and that enters the interior enclosure of the disc drive.

In various embodiments, the vapor-trapping pathway 225 can be implemented to function in several ways to limit the escape of vapors. The vapor-trapping pathway 225 significantly extends the length that the vapor must travel to escape the E-block 205; the extended length increases the amount of vapor that condenses along the walls of the vapor-trapping pathway 225. Furthermore, the length of the vapor-trapping pathway 225 and the angles of the turns of the vapor-trapping pathway 225 further limit such flow of vapor out of the E-block 205. Also, the vapor-trapping pathway 225 limits the flow of air, caused by the rotation of the discs in the interior enclosure of the disc drive, from entering the E-block 205 and aiding in the vaporization of the grease in the cartridge bearing assembly 215. In-turn, this limits the amount of vapor that escapes the E-block 205.

For high speed disc drives, a spindle motor assembly 212 may operate at rotational speeds such as 7,200 rounds-per-minute (rpm), 10,000 rpm, or 15,000 rpm. The high rpm of the discs result in higher temperatures and increased air flow within the disc drive which contributes to bearing outgassing. The actuator assembly also operates at a high rate of speed in order to achieve the input-outputs-per-second (iops) required of a high performance drive. As the cartridge bearing assembly 215 rotates, and in-turn the E-block 205, small particles of grease in the cartridge bearing assembly 215 can splash and mix with atmosphere to form vapor. As discussed above, such vaporized grease has the potential to outgas from the cartridge bearing assembly 215 into the interior enclosure of the disc drive, which is further facilitated by high temperatures and air flow within the disc drive. The vapor that escapes through gaps in the cartridge bearing assembly 215 is pushed towards the outer diameter of the E-block 205 as a result of the centrifugal force created by the spinning air.

The centrifugal force causes much of the vapor to condense along the second wall 262. Also, some of the vapor condenses along the first wall 261. The vapor that does not condense along the second wall 262 or first wall 261 is then required to travel around a portion 260, facing the upwardly-facing portion of the base. However, this vapor encounters much resistance due to the fact that it is traveling parallel to the centrifugal force of the spinning air.

The vapor that makes it around the bend formed by the portion 260, of the E-block 205, facing the upwardly-facing portion of the base and the second step 255 is then required to travel counter to gravity and parallel to the centrifugal force of the spinning air. These forces acting on the remaining vapor causes a majority of the remaining vapor to condense or be trapped against the second step 255, a fourth wall 264, as well as, (to a lesser extent) the portion 260, facing the upwardly-facing portion of the base, and a third wall 263. Much of the condensed vapor on the walls eventually slides down the walls and collects in the second step 255. In many applications sufficient condensation is provided by only two of the three illustrated steps, thus only one wall step on either side of the lower step 255 is necessary in certain embodiments.

Figure 3:
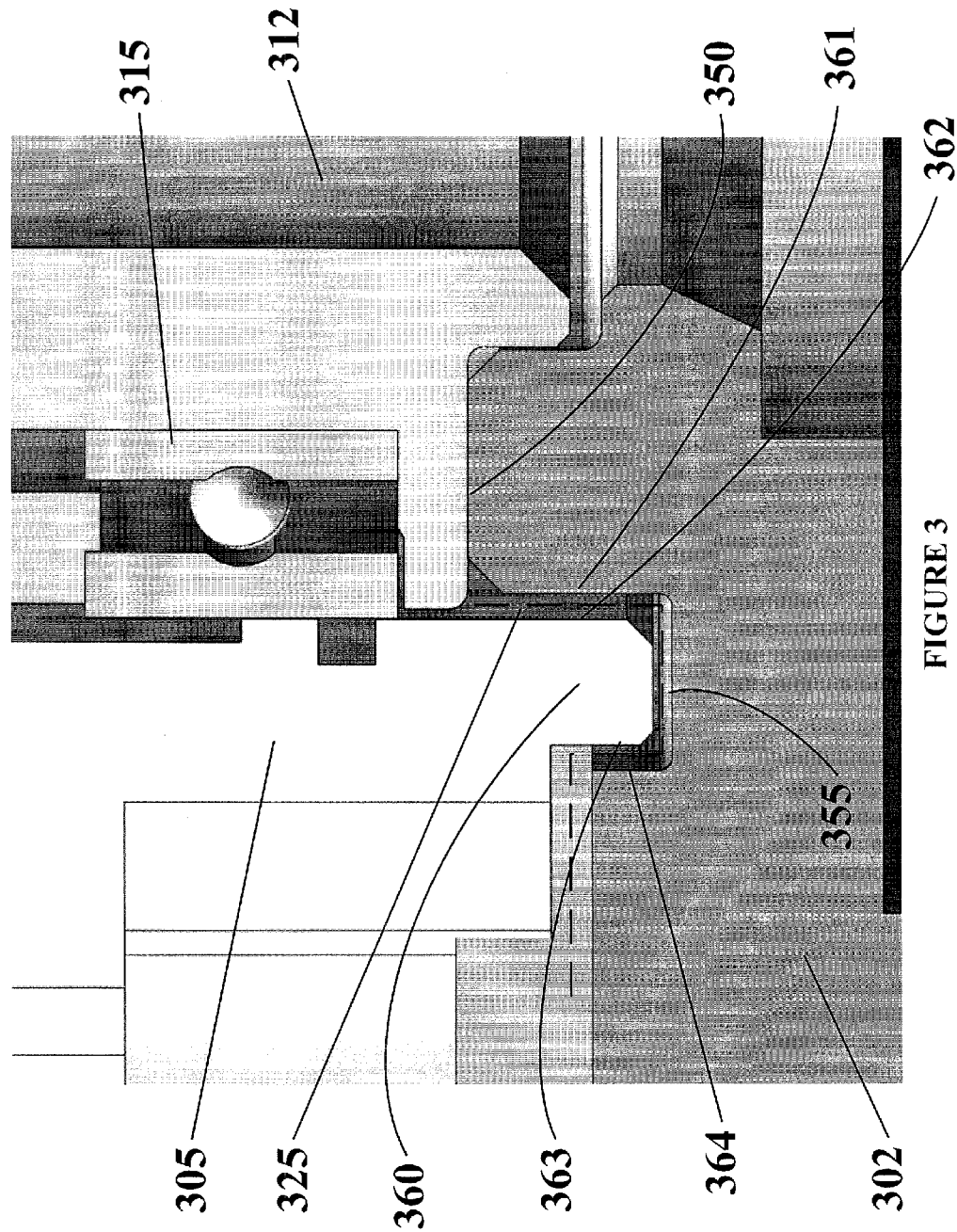
FIG. 3 is a close-up cross-sectional side view of an actuator assembly including a vapor-trapping pathway, consistent with various aspects of the present disclosure.

Referring now to FIG. 3 which illustrates a close-up cross-sectional side view of a vapor-trapping pathway 325 (further indicated by a dotted line), consistent with various aspects of the present disclosure. This figure has been included to provide further clarity to the structures as described above in relation to FIG. 2.

A vapor-trapping pathway as presented in this present disclosure, has been modeled and tested to evidence significant and surprising results attributed to use of such a vapor-trapping pathway. In one such successful test, this type of the vapor-trapping pathway reduced outgassing by over ten times as compared to a conventional design which gasses between an E-block and its base platform, with up to one step, escapes. Accordingly, based upon the above discussion and illustrations, those skilled in the art will readily recognize that various modifications and changes may be made to the present disclosure without strictly following the exemplary embodiments and applications illustrated and described herein. For example, a vapor-trapping pathway may contain a plurality of trap regions. Such modifications do not depart from the true spirit and scope of the present disclosure, including that set forth in the following claims.

What is claimed is:

1. An apparatus comprising:
   a base having an upwardly-facing portion with a first step and an adjacent second step that is lower than the first step;
   a disc drive actuator assembly including
      a pivot shaft fixed relative to the base,
      an E-block having a portion facing the upwardly-facing portion of the base,
      a plurality of bearings configured and arranged to facilitate rotation of the E-block around the pivot shaft; and
   a vapor-trapping pathway traversing the first step and a trap region that is partly defined by the second step, the vapor-trapping pathway being configured and arranged to pass vapor flow outwardly, relative to the pivot shaft, from a level below the plurality of bearings to the trap region.

2. The apparatus of claim 1,
   wherein the E-block includes an extruding portion that extends into the trap region;
   the E-block and the base are separated from one another by an air gap and configured to define an elongated portion of the vapor-trapping pathway; and
   the vapor-trapping pathway is configured and arranged to contain and condense vapor along a 0.13 inch run.

3. The apparatus of claim 1, further including an inner race fixed relative to the pivot shaft,
   an outer race fixed relative to the E-block, and wherein the plurality of bearings are located between the inner race and the outer race.

4. The apparatus of claim 1, wherein the E-block and the base define an elongated portion of the vapor-trapping pathway that is configured and arranged to block vapor flow by a first wall adjacent the trap region and defined by a transition between the first step and the second step.

5. The apparatus of claim 4, wherein the vapor-trapping pathway is configured and arranged to pass vapor into the trap region at which condensation of the vapor is facilitated.

6. The apparatus of claim 1, wherein the vapor-trapping pathway is configured and arranged with a third step, wherein the first step, the second step and the third step are configured and arranged to direct vapor into a first wall, a second wall and a third wall.

7. The apparatus of claim 1, wherein the vapor-trapping pathway includes a first turn, a second turn, and a third turn, the vapor-trapping pathway configured and arranged to pass vapor along three steps, including the first step and the second step, and through the three turns from below the plurality of bearings toward an outlet.

8. The apparatus of claim 1, wherein a second wall of the vapor-trapping pathway is configured and arranged to condense vapor on the second wall due to centrifugal force acting on the vapor caused by a rotation of the E-block, wherein the force places some of the vapor into contact with the second wall, whereby the condensed vapor on the second wall accumulates in the second step of the base due to a gravitational force acting on the condensed vapor.

9. The apparatus of claim 1, wherein the second step of the base is configured and arranged to condense, and thereby collect, vapor in response to gravitational forces acting on the vapor, in turn, causing the vapor to contact the second step of the base and condense.

10. The apparatus of claim 1, wherein a fourth wall of the vapor-trapping pathway is configured and arranged to condense vapor on the fourth wall due to centrifugal force acting on the vapor caused by a rotation of the E-block, wherein the force places some of the vapor into contact with the fourth wall, whereby the condensed vapor on the fourth wall accumulates in the second step of the base due to a gravitational force acting on the condensed vapor.

11. A method for lessening outflow of vapor in a disc drive apparatus having a base and a disc drive actuator assembly that includes an E-block and a pivot shaft fixed relative to the base, the method comprising:
   providing a vapor-trapping pathway between the base and the E-block, the vapor-trapping pathway defined by
      an upwardly-facing portion of the base with a first step and an adjacent second step that is lower than the first step, and
      a portion of the E-block that faces the upwardly-facing portion of the base; and
   operating the disc drive apparatus by causing the E-block to rotate around the pivot shaft, via a plurality of bearings; and
   from a level below the plurality of bearings, trapping vapor in a vapor-trapping pathway that traverses the first step and a trap region that is partly defined by the second step, the vapor-trapping pathway being configured and arranged to pass vapor flow outwardly, relative to the pivot shaft.

12. The method of claim 11,
   wherein the portion of the E-block that faces the upwardly-facing portion of the base is an extruding portion that extends into the trap region;
   the E-block and the base are separated from one another by an air gap and configured to define an elongated portion of the vapor-trapping pathway; and
   the vapor-trapping pathway is configured and arranged to contain and condense vapor along a run, in a range of between 0.1 inches and 0.25 inches during the step of trapping vapor.

13. The method of claim 11, wherein the disc drive apparatus further includes an inner race fixed relative to the pivot shaft, an outer race fixed relative to the E-block, and wherein the plurality of bearings are located between the inner race and the outer race.

14. The method of claim 11, wherein the E-block and the base define an elongated portion of the vapor-trapping pathway that blocks vapor flow by a first wall adjacent the trap region and defined by a transition between the first step and the second step.

15. The method of claim 14, wherein the step of trapping vapor further includes passing vapor into the trap region at which condensation of the vapor is facilitated.

16. The method of claim 11, wherein the step of trapping vapor further includes using a third step, wherein the first step, the second step and the third step of the vapor-trapping pathway direct vapor into a first wall, a second wall and a third wall.

17. The method of claim 11, wherein the step of trapping vapor further includes passing vapor along the vapor-trapping pathway including the three steps, the first step and the second step, and a first turn, a second turn, and a third turn, from below the plurality of bearings toward an outlet.

18. The method of claim 11, wherein the step of trapping vapor further includes condensing vapor on a second wall of the vapor-trapping pathway utilizing centrifugal force, acting on the vapor caused by a rotation of the E-block, such force placing some of the vapor into contact with the second wall, whereby the condensed vapor on the second wall accumulates in the second step of the base due to a gravitational force.

19. The method of claim 11, wherein the step of trapping vapor further includes condensing vapor on the second step of the base utilizing gravitational forces acting on the vapor, and causing the vapor to contact the second step of the base and condense.

20. The method of claim 11, wherein the step of trapping vapor further includes condensing vapor on a fourth wall of the vapor-trapping pathway utilizing centrifugal force, acting on the vapor caused by a rotation of the E-block, such force placing some of the vapor into contact with the fourth wall, whereby the condensed vapor on the fourth wall accumulates in the second step of the base due to a gravitational force.

* * * * *